March 14, 1967 R. B. CRAWFORD 3,308,923
ARTICLE POSITIONING DEVICE
Filed Oct. 22, 1965 2 Sheets-Sheet 1

RICHARD B. CRAWFORD
INVENTOR

Huebner & Worrel
ATTORNEYS

March 14, 1967

R. B. CRAWFORD 3,308,923

ARTICLE POSITIONING DEVICE

Filed Oct. 22, 1965

RICHARD B. CRAWFORD
INVENTOR

Huebner & Worrel
ATTORNEYS ns patent of the United States Patent Office 3,308,923
Patented Mar. 14, 1967

3,308,923
ARTICLE POSITIONING DEVICE
Richard B. Crawford, 6067 N. Forkner,
Fresno, Calif. 93705
Filed Oct. 22, 1965, Ser. No. 501,338
8 Claims. (Cl. 198—33)

This invention relates to an article positioning device for precisely arranging articles during their movement along a powered conveyor and more particularly to such a device which insures that the articles are motivated toward the discharge end of the conveyor in a predetermined straightened attitude for easier subsequent handling. Although designed to be used to facilitate the handling of cotton bales in a cotton gin, the device is not restricted to such use.

The device of the present invention is specifically intended to be employed with the device of my copending application entitled, "Load Lifting Device," Ser. No. 463,714, filed June 14, 1965, now abandoned, and the device of my copending application entitled, "Load Discharge Device," Ser. No. 463,818, filed June 14, 1965. The structure of my first designated copending application is adapted to place a bale of cotton on a transfer conveyor in the proper position for subsequent handling following its discharge from a high density press or the like. The structure of my second designated copending application is positioned at the discharge end of the conveyor for depositing each bale successively on the floor of the gin in the optimum position for suitable bale handling equipment to lift each bale and load it into a large capacity bale hauling truck.

It has been found desirable in use more precisely to position the bale with respect to the conveyor before the bale is discharged from it. Although the first structure places the bale on the conveyor in the general orientation desired, further positioning is usually desirable if the load discharge device is to operate most successfully. Obviously, manual positioning of the bale is tedious and time-consuming while being extremely inefficient.

Therefore, it is an object of the present invention to provide an improved article positioning device.

Another object is to provide such an improved article positioning device which is capable of more precisely positioning cotton bales with respect to a conveyor on which the bales are supported.

Another object is to provide such an article positioning device which operates completely automatically and requires no manual operation.

Another object is to provide an article positioning device which more precisely positions bales on a conveyor for subsequent bale handling operations.

Another object is to provide an article positioning device which automatically restrains and positions each bale individually on the conveyor.

Another object is to provide an article positioning device which is adaptable for operation on a variety of conveyors.

Another object is to provide an article positioning device which may be positioned at any suitable location along a conveyor.

Another object is to provide an article positioning device which automatically restrains and positions each bale on a conveyor, retracts to allow it to pass, and subsequently re-extends itself for the positioning of the next bale.

Another object is to provide an article positioning device of the character described which is inexpensive to operate, requires little maintenance, is of simple construction, and is inexpensive to manufacture.

Other objects and advantages of the present invention will subsequently become more clearly apparent upon reference to the following description and accompanying drawing.

Figure 2:
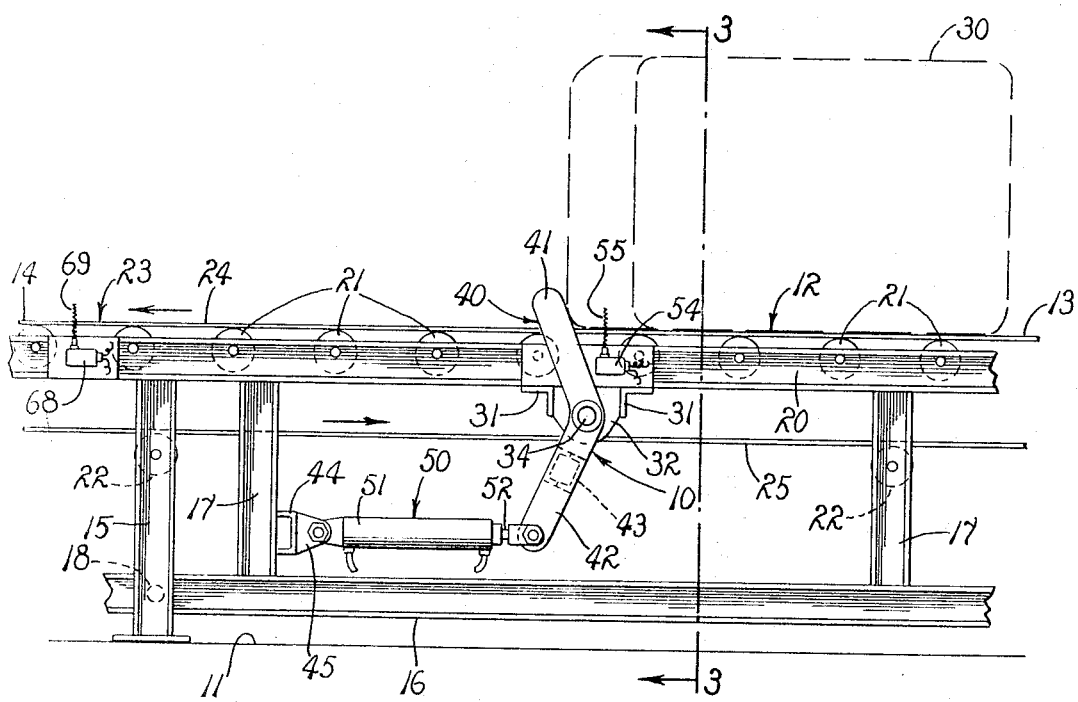
FIG. 2 is a side elevation of the bale positioning device.
Figure 3:
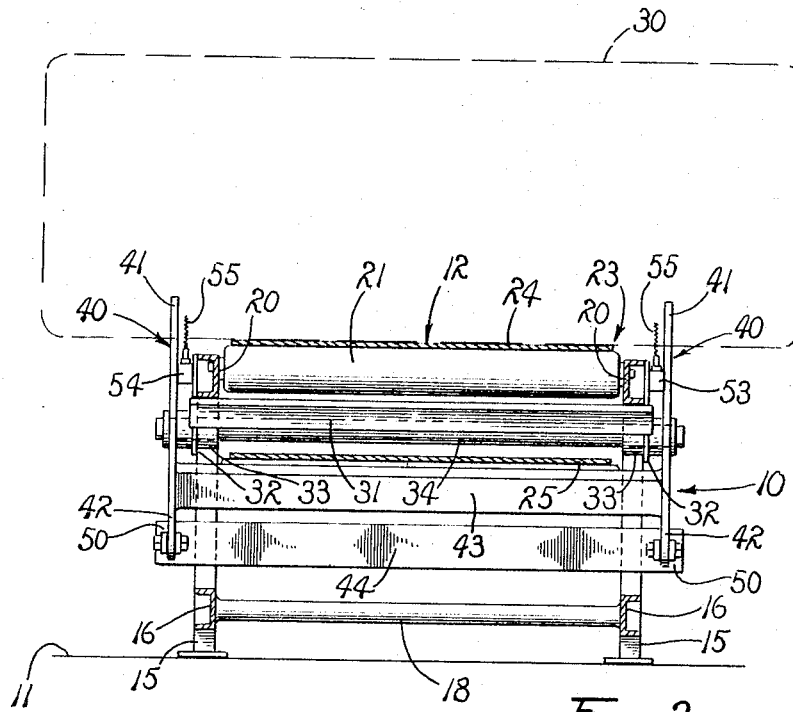
FIG. 3 is a front elevation of the bale positioning device and section through the conveyor, taken on line 3—3 of FIG. 2.

Referring in greater particularity to the drawing, a bale positioning device embodying the principles of the present invention is generally indicated at 10. A floor surface 11 of a cotton gin is seen in FIGS. 2 and 3. A conveyor generally indicated at 12 having a receiving end 13 and a discharge end 14 is positioned on the floor surface. The conveyor provides upright support beams 15 secured to the floor surface in pairs along the length of the conveyor. Horizontal cross members 16 are mounted between the beams. Vertically standing secondary support beams 17 are mounted in spaced relation on the cross members in pairs along the length of the conveyor. A tubular brace member 18 is mounted horizontally between and normal to each pair of support beams 15 at their connections with cross members 16. Two horizontally parallel roller support members 20 are affixed to the uppermost portions of the support beams 15 and 17. Horizontal conveyor rollers 21 are rotatably extended between and normal to the support members 20 in predetermined spaced relation along their sides. Secondary conveyor rollers 22 are mounted horizontally between selected ones of the support beams 15 and 17 below the rollers 21. An endless conveyor belt 23 having an upper run 24 and a lower run 25 is provided on the rollers. The upper run rests on the rollers 21 and the lower run rests on the rollers 22. Suitable drive means, not shown, is provided to rotate the conveyor belt in a counterclockwise direction on the rollers, as shown in FIG. 2. A high density cotton bale 30 is shown in dashed lines supported on the conveyor 12 in FIGS. 1, 2 and 3. When in operation, the bale has a path of travel along the conveyor as it is carried on the belt 23.

Two back-to-back, spaced, substantially parallel, angle iron members 31 are mounted in interconnecting relation between the support members 20, as by welding or the like. A bearing flange 32 extends vertically below each of the support members 20 between the parallel angle iron members. Shaft bearings 33 are correspondingly affixed in each of the flanges. A horizontal shaft 34 is rotatably mounted in the bearings normal to each of the support members. A pair of bale constraining arms 40 are individually mounted on the ends of the shaft outwardly adjacent to the flanges. Each of the arms has an upper bale blocking end 41 which extends into the path of travel of a bale being carried on the conveyor 12 and an angulated lower lever end 42. A horizontal brace member 43 is mounted between the lever ends of the constraining arms adjacent to the shaft.

A channel member 44 is horizontally mounted between two of the transversely aligned support beams 17 adjacent to their respective cross members 16. The ends of the channel member extend predetermined distances outwardly on both sides of the conveyor 12. The beams 15 and 17, cross members 16, roller beams 20, angle iron members 31, brace member 43, and brace member 35 form the frame of the conveyor. A pair of ram flanges 45 are individually affixed at right angles to the channel member at its opposite ends and extend toward the receiving end 13 of the conveyor. A pair of pneumatic rams 50 having cylinder ends 51 and rod ends 52 are individually pivotally connected at their cylinder ends to the ram flanges 45 and at their rod ends to the lever ends 42 of the arms 40.

Figure 1:
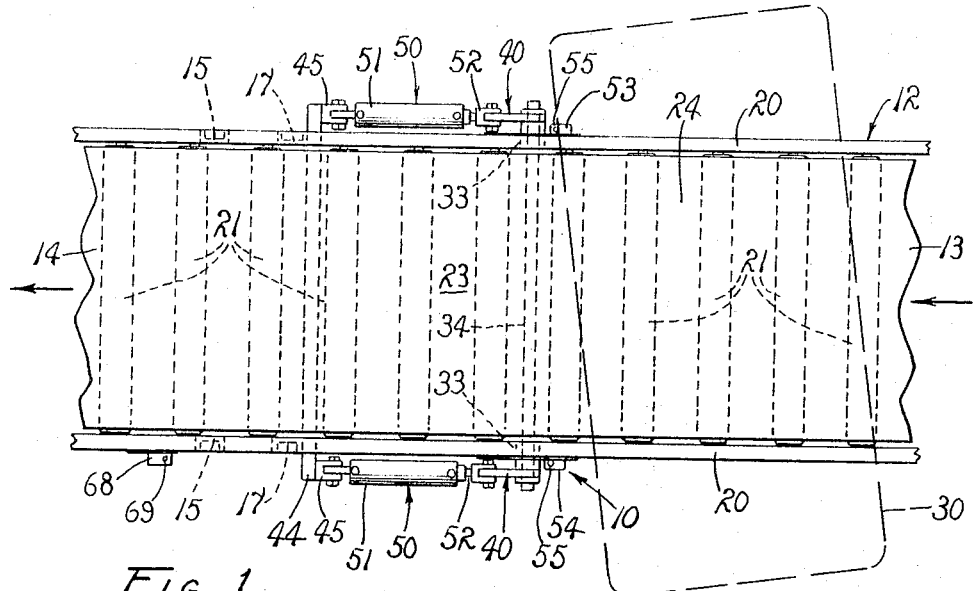
FIG. 1 is a top plan view of a bale positioning device embodying the principles of the present invention mounted on a conveyor showing a bale in misaligned position on the conveyor.
Figure 4:
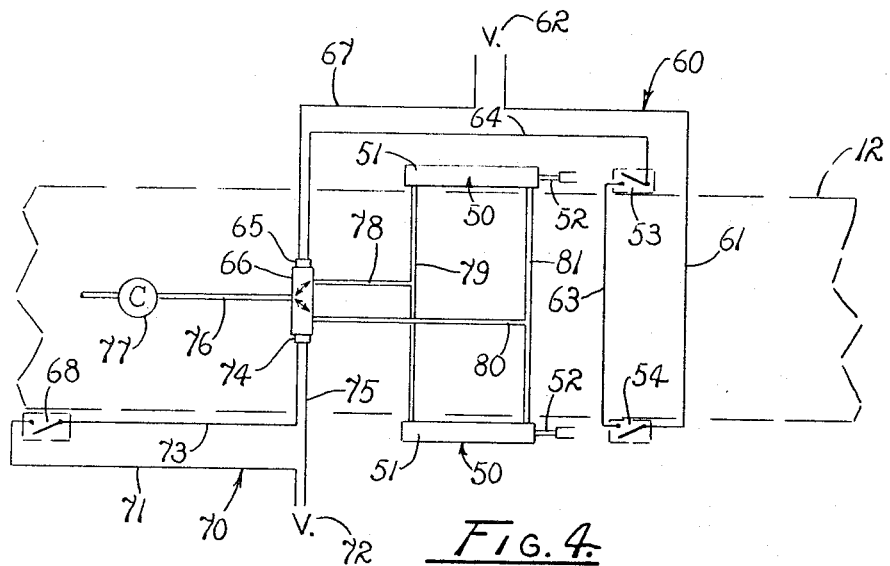
FIG. 4 is a schematic diagram of an electrical circuit and pneumatic actuating system for the bale positioning device.

A pair of arm actuating switches 53 and 54 are individually mounted on opposite sides of the conveyor 12, as viewed in FIGS. 1, 3, and 4. The actuating switches are mounted closely adjacent to and in front of their respective constraining arms 40. Each actuating switch has an upright resiliently flexible finger 55 which extends into the path of travel of a bale transported on the conveyor. An arm actuating circuit 60 is composed of a line 61 which extends from a source of power 62 to an end of the actuating switch 54. A line 63 runs from the opposite end of actuating switch 54 to an end of actuating switch 53. A line 64 connects the opposite end of actuating switch 53 with an actuating solenoid 65 which in turn is in controlling engagement with one end of a pneumatic control valve 66. A line 67 extends from the solenoid back to the source of power 62.

An arm return switch 68 is mounted on one of the roller support members 20 a predetermined distance rearwardly of one of the constraining arms 40. The switch provides an upright resiliently flexible finger 69 which extends into the path of travel of the bales carried on the conveyor belt 23. An arm return circuit 70 is composed of a wire 71 which leads from a source of power 72 to one end of the arm return switch 68. A wire 73 leads from the opposite end of that switch to a return solenoid 74 which in turn is mounted in controlling engagement with the end of the control valve 66 opposite that of solenoid 65. A wire 75 connects the solenoid 74 with the source of power 72. Both of the circuits 60 and 70 are normally held in an open position within each of the switch boxes as shown in FIG. 4 by their respective flexible fingers 55 and 65 which are held in normal upright position by springs, not shown. A pneumatic conduit 76 connects the control valve 66 to a pneumatic compressor 77. A pneumatic actuating conduit 78 is connected between the control valve and a branch conduit 79 which is connected to each of the rams 50 adjacent to their cylinder ends 51. A pneumatic return conduit 80 communicates between the control valve and the branch return conduit 81 which is connected to each of the rams adjacent to their rod ends 52. It is apparent that the control valve 66, the conduit 76, the pneumatic compressor 77 and the conduits 78, 79, 80 and 81 make up an actuating system for operating the pneumatic rams 50. The arm actuating switches 53 and 54, the return switch 68, and their flexible fingers 55 and 69 serve as indicators to show the position of the bales.

Operation

The operation of the described embodiment of the subject invention is believed to be readily apparent and is briefly summarized at this point. Cotton bales 30 which are ejected from the high density press or the like are placed on the conveyor belt 23 by the Load Lifting Device of my copending application Ser. No. 463,714 in positions approximately normal to the direction of travel of the belt. However, usually they are not precisely so positioned. As a bale is moved along the conveying machine 12 on the belt, the leading end of the bale strikes the flexible finger 55 on its respective side of the conveyor. This forces the finger against its spring and closes the section of the arm actuating circuit 60 through the arm actuating switch 53 of that finger, as best shown in FIG. 1. Almost simultaneously the leading end of the bale abuts against the bale blocking end 41 of the constraining arm 40 on that side of the conveyor and thereby is restrained from any further movement with the conveyor belt which also keeps that section of the circuit 60 closed. However, the trailing end of the bale continues to move with the belt until it makes contact with the flexible finger 55 of the other arm actuating switch 54 and almost simultaneously its corresponding constraining arm. Thus, the bale is positioned precisely normal to the direction of travel of the belt. As a result of the bale contacting the flexible finger, the finger is forced against its spring and thus the arm actuating circuit 60 within the arm actuating switch of that finger is closed consequently completing the circuit. Therefore, the solenoid 65 is actuated by power traveling through the circuit 60 from the source of power 62 and in turn operates the control valve 66, thus allowing air under pressure to travel from the compressor 77, through the conduit 76, the control valve, the conduits 78, 79 and into the cylinder end 51 of the rams 50. This causes extension of the rod ends 52 of both rams and hence movement of the lever end of the constraining arms in a counterclockwise direction, as shown in FIG. 2, and as a result rotates the bale blocking end of the constraining arm out of the path of travel of the bale.

The bale 30 subsequently proceeds along the conveyor 12 on the belt 23. When the bale has passed over the flexible fingers 55 of the arm actuating switches 53 and 54, the fingers under force of their springs are returned to their normal positions thus reopening the circuit 60 through each switch and terminating the flow of power. Hence, the fingers are repositioned for handling of the next bale. After moving a predetermined distance, the bale contacts the flexible finger 69 of the arm return switch 68, thus closing the arm return circuit 70 and allowing power to reach the return solenoid 74 through the circuit from the source of power 72. The solenoid this operates the pneumatic valve to allow air under pressure again to travel from the compressor 77, the conduit 76, the control valve 66 into the conduits 80 and 81 and thus into the rams 50 adjacent to their rod ends 52. Consequently, the ram retracts the lever ends 42 of the constraining arms 40 rotating them in a clockwise direction to the position shown in FIG. 2. Thus, the bale blocking ends 41 of the arms are repositioned in the path of travel of the next bale. As the bale continues to be carried by the belt 23, it travels past the flexible finger 69, thus releasing it and allowing it, under force of its spring, to return to its normal position. Hence, the section of the arm return circuit 70 is reopened, terminating the flow of power through the circuit and making it ready for actuation by the next bale.

The repositioned bale proceeds along the conveyor 12 in its new position precisely normal to the direction of travel of the belt 23. Upon reaching the discharge end 14 of the machine, the Load Discharge Device of my copending application Ser. No. 463,818 receives and discharges the bale from the conveyor.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An article positioning device for arranging articles in a predetermined proper attitude during their movement along a transporting mechanism, comprising article constraining means pivotally mounted on said transporting mechanism for movement between an extended article engaging position within the path of movement of such articles and a position retracted therefrom, force means connected to said constraining means to extend and to hold the same in said article engaging position temporarily to restrict movement of improperly oriented articles along said transporting mechanism until their movement disposes them in said proper attitude against said constraining means, and means on the transporting mechanism connected to said force means being effective upon engagement by said properly oriented articles alternately to retract and to extend said constraining means.

2. An article positioning device for arranging articles in a predetermined proper attitude during their movement along a transporting mechanism comprising article constraining means pivotally mounted on said transporting mechanism for movement between an article engaging position within the path of movement of such articles temporarily to restrict movement of improperly oriented articles therealong and a position retracted therefrom to release the articles in said predetermined proper attitude, powered means on the transporting mechanism connected to said constraining means to swing the same between said article engaging position and said retracted position, and a pair of switch means on the transporting mechanism connected to said powered means and being alternately engageable by the articles to retract said constraining means subsequent to movement of the articles against the constraining means and to extend the same for engagement with successive articles.

3. An article positioning device for arranging articles in a predetemined proper attitude during their movement along a transport mechanism, comprising indicator means on the transporting mechanism; constraining arms pivotally mounted on the transport mechanism for movement between an extended article engaging position within the path of movement of such articles temporarily to restrict movement of improperly oriented articles therealong and a position retracted therefrom to release the articles in said predetermined proper attitude; powered means on said transporting means operatively connected to said constraining arms to swing the arms between said extended and retracted positions; and an actuating member mounted on the transporting mechanism operatively connected to said powered means and the indicator means alternately to retract said constraining arms subsequent to movement of the articles against the constraining arms and to extend the same for engagement with successive articles.

4. An article positioning device for adjusting articles during movement along a conveyor to a predetermined proper attitude with respect to their path of travel, comprising a pair of spaced switch means on the conveyor; constraining arms pivotally mounted on opposite sides of the conveyor and adapted to be positioned between predetermined extended and retracted positions with the arms respectively extended into or retracted from the path of travel of the articles; powered means on the conveyor connected to said constraining arms to extend and to retract the arms; and an actuating mechanism on the conveyor operatively connected to said powered means and switch means to retract said constraining arms subsequent to movement of a properly oriented article against the constraining arms and to extend said constraining arms after release of the article for alternately constraining improperly oriented articles and releasing properly oriented articles along the conveyor.

5. A bale positioning device for manipulating bales during movement along a conveyor to a predetermined normal position with respect to their path of travel, comprising constraining arms pivotally mounted on opposite sides of the conveyor and adapted to be rotated between predetermined extended and retracted positions with the arms respectively extended into and retracted from the path of travel of the articles; an actuating switch mounted adjacent to and ahead of each of the positioning arms with respect to the direction of movement and extending into the path of travel of the bales; a return switch mounted on the conveyor a predetermined distance behind the constraining arms and extending into the path of travel of the bales; powered means operatively connected to the constraining arms; and an actuating mechanism on the conveyor operatively connected between said powered means and the actuating and return switches to extend and retract the constraining arms incident to bale contact with a predetermined combination of switches so as successively to orient each bale to a position normal to the path of travel of the bales.

6. A bale positioning device for manipulating bales to predetermined positions with respect to the path of travel of bales during their movement along a conveyor, comprising corresponding bale constraining arms pivotally mounted on opposite sides of the conveyor adapted to be rotated between predetermined extended and retracted positions with the arms respectively extended into and retracted from the path of travel of the bales; an actuating switch mouted adjacent to and ahead of each of the arms and extending into the path of travel of the bales; an arm actuating circuit operably connected to the actuating switches; power means mounted on the conveyor and connected to each of the constraining arms; a return switch mounted on the conveyor a predetermined distance behind the constraining arms and extending into the path of travel of the bales; an arm return circuit in operable connection with the arm return switch; and an actuating mechanism in connection with both the actuating and return switches through the circuits to operate the power means to extend and to retract the constraining arms incident to bale contact with a predetermined combination of switches so as successively to orient each bale to a position normal to the path of travel of the bales.

7. A bale positioning device for manipulating bales to predetermined positions normal to the path of travel of bales during their movement along a conveyor having opposite sides, comprising corresponding bale constraining arms pivotally mounted on opposite sides of the conveyor; an actuating switch mounted adjacent to and ahead of each of the constraining arms and extending into the path of travel of the bales; an arm actuating circuit operably connected to the actuating switches; powered rams mounted on the conveyor and connected to each of the constraining arms; an arm return switch mounted on the conveyor a predetermined distance behind the constraining arms and extended into the path of travel of the bales; an arm return circuit in operable connection with the arm return switch; solenoids operably connected to each circuit; and an actuating mechanism in connection with the solenoids and constraining arms whereby the bales are positioned against the arms normal to their path of travel so as to trip the actuating switches to retract the arms through the actuating circuit, solenoids, actuating mechanism, and rams and allows the bales to proceed along the conveyor until tripping the return switch to rotate the arms through the return circuit, solenoid, actuating mechanism, and rams for positioning of succeeding bales.

8. A bale positioning device for arranging bales in a predetermined straightened attitude upon a powered conveyor having a frame providing opposite sides and affording an elongated path of travel for the bales with the bales having opposite ends disposed in laterally overhanging relation with respect to the conveyor, comprising a pair of laterally spaced integral bale constraining arms pivotally mounted on the conveyor frame respectively adjacent to said sides thereof for simultaneous movement between a bale engaging position extended into said path of travel temporarily to restrict movement of the bales along the conveyor, and a retracted position with the arms displaced therefrom; powered means on the conveyor frame for swinging the arms between their bale engaging and retracted positions; a pair of switches individually mounted on said sides of the conveyor frame in said path of travel and immediately ahead of said arms when the arms are in said bale engaging position; means operatively interconnecting said switches and said powered means for energizing said powered means to motivate the arms to their retracted position incident to movement of each end of the bales against the switches and the arms at their respective sides of the conveyor frame to release the bales for further movement along the conveyor in said straightened atttude; and an arm return mounted on the conveyor frame for engagement by the bales after the bales are passed said retracted arms with said return switch being operatively associated with said interconnecting means to energize said powered means to return the arms to their bale engaging position.

References Cited by the Examiner
UNITED STATES PATENTS
2,501,961  3/1950  Paton _____ 198—33.2

EVON C. BLUNK, *Primary Examiner.*
RICHARD E. AEGERTER, *Examiner.*